United States Patent
Burr (10) Patent No.: US 7,190,961 B2
(45) Date of Patent: Mar. 13, 2007

(54) METHOD FOR DISCOVERY AND ROUTING WITHIN MOBILE AD-HOC NETWORKS

(75) Inventor: Jeremy Burr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 494 days.

(21) Appl. No.: 10/035,896

(22) Filed: Oct. 18, 2001

(65) Prior Publication Data

US 2003/0078062 A1 Apr. 24, 2003

(51) Int. Cl.
*H04B 7/005* (2006.01)

(52) U.S. Cl. .................. 455/502; 455/41.2; 370/338
(58) Field of Classification Search ............. 455/41.2, 455/41.3, 445, 426.1, 11.1, 13.1, 432.2, 553.1, 455/324, 552.1; 370/338, 350, 502, 389; 709/220, 221
See application file for complete search history.

(56) References Cited

U.S. PATENT DOCUMENTS

| | | | |
|---|---|---|---|
| 5,583,866 A | * 12/1996 | Vook et al. | 370/312 |
| 6,026,297 A | * 2/2000 | Haartsen | 455/426.1 |
| 6,055,429 A | * 4/2000 | Lynch | 455/445 |
| 6,287,200 B1 | 9/2001 | Sharma | |
| 6,473,405 B2 | 10/2002 | Ricciulli | |
| 6,561,809 B1 | 5/2003 | Lynch et al. | |
| 6,590,891 B1 | * 7/2003 | Jacquet et al. | 370/350 |
| 6,601,093 B1 | * 7/2003 | Peters | 709/220 |
| 6,603,740 B1 | * 8/2003 | Du | 370/248 |
| 6,714,793 B1 | 3/2004 | Carey et al. | |
| 6,816,460 B1 | 11/2004 | Ahmed et al. | |
| 6,819,919 B1 | 11/2004 | Tanaka | |
| 6,922,567 B1 | 7/2005 | Rydbeck | |
| 7,035,653 B2 | 4/2006 | Simon et al. | |
| 2002/0034292 A1 | 3/2002 | Tuoriniemi et al. | |
| 2002/0103662 A1 | 8/2002 | Burr | |
| 2002/0122410 A1 | 9/2002 | Kulikov et al. | |
| 2002/0183068 A1 | 12/2002 | Dunko et al. | |
| 2003/0045272 A1 | 3/2003 | Burr | |
| 2003/0045296 A1 | 3/2003 | Burr | |
| 2003/0079003 A1 | 4/2003 | Burr | |
| 2004/0023678 A1 | * 2/2004 | Fredriksson | 455/502 |

FOREIGN PATENT DOCUMENTS

| | | |
|---|---|---|
| WO | WO 99/04578 | 1/1999 |
| WO | WO 00/22860 | 4/2000 |
| WO | WO 01/24457 | 4/2001 |
| WO | WO 01/50680 | 7/2001 |

OTHER PUBLICATIONS

Haartsen et al., "The Bluetooth Radio System", IEEE Personal Communications, IEEE Communications Society, US, vol. 7, No. 1, Feb. 2000, pp. 28–36.
James Kardach, "Bluetooth Architecture Overview", Intel Corporation, Mar. 18, 1999.
U.S. Appl. No. 09/930,779, filed Aug. 15, 2001, Burr.
Copy of International Search Report from PCT/US02/33421, mailed on Mar. 11, 2003.

* cited by examiner

*Primary Examiner*—Edan Orgad
(74) *Attorney, Agent, or Firm*—Pearl Cohen Zedek Latzer, LLP (57) ABSTRACT

A device scans its range for newly-discovered devices in a mobile ad-hoc network. Upon detecting a newly-discovered device, the two devices arbitrate how to synchronize their internal clocks. The devices then re-synchronize on schedule to enable data transmission. The devices may dynamically rearbitrate synchronization. The network as a whole is an emergent property of the peer-to-peer relationships between pairs of devices.

31 Claims, 10 Drawing Sheets

METHOD FOR DISCOVERY AND ROUTING WITHIN MOBILE AD-HOC NETWORKS

RELATED APPLICATION DATA

This application is related to U.S. patent application Ser. No. 09/773,682, titled "ENABLING RESTRICTED COMMUNICATIONS BETWEEN A PLURALITY OF USERS", filed Jan. 31, 2001, and to U.S. patent application Ser. No. 09/930,779, titled "METHOD FOR DISCOVERY AND ROUTING USING BUDDY LISTS IN MOBILE AD-HOC NETWORKS", filed Aug. 15, 2001, and to U.S. patent application Ser. No. 09/948,300, titled "METHOD FOR RESTRICTED COMMUNICATIONS USING BUDDY LISTS IN MOBILE AD-HOC NETWORKS", filed Sep. 6, 2001, and to U.S. patent application Ser. No. 09/948,270, titled "METHOD FOR DISCOVERY AND ROUTING USING ATTRIBUTES IN MOBILE AD-HOC NETWORKS", filed Sep. 6, 2001, and to U.S. patent application Ser. No. 10/035,463, titled "METHOD FOR DISCOVERY AND ROUTING USING A PRIORI KNOWLEDGE IN THE FORM OF APPLICATION PROGRAMME WITHIN MOBILE AD-HOC NETWORKS", filed Oct. 18, 2001.

FIELD OF THE INVENTION

This invention pertains to mobile ad-hoc networks, and more particularly to communication within a mobile ad-hoc network.

BACKGROUND OF THE INVENTION

The ability to communicate with others has always been an important function for people. First the telegraph, and then the telephone revolutionized communication, by making communication at a distance possible. The cellular telephone marked a further turning point in communication, as people were no longer tied to a phone with a fixed physical location. And the more recent Bluetooth standard (Specification of the Bluetooth System, Version 1.1, Feb. 22, 2001) and 802.11a standard (IEEE Standard 802.11a-1999, available on the Institute of Electrical and Electronics Engineers web site, http://standards.ieee.org/reading/ieee/std/lanman/802.11a-1999.pdf) describe how wireless communication may be achieved using mobile devices.

Where mobile devices attempt to intercommunicate, a mobile ad-hoc network (MANET) is set up. In contrast to the typically-envisioned computer network, a MANET does not consist of separate servers and clients. Instead, each mobile device acts as both client and server. That is, each mobile device is responsible for not only sending messages on its own, but also for routing messages. Further, each mobile device needs to be able to route messages sent by a different device, and bound for a different destination.

Figure 1A:
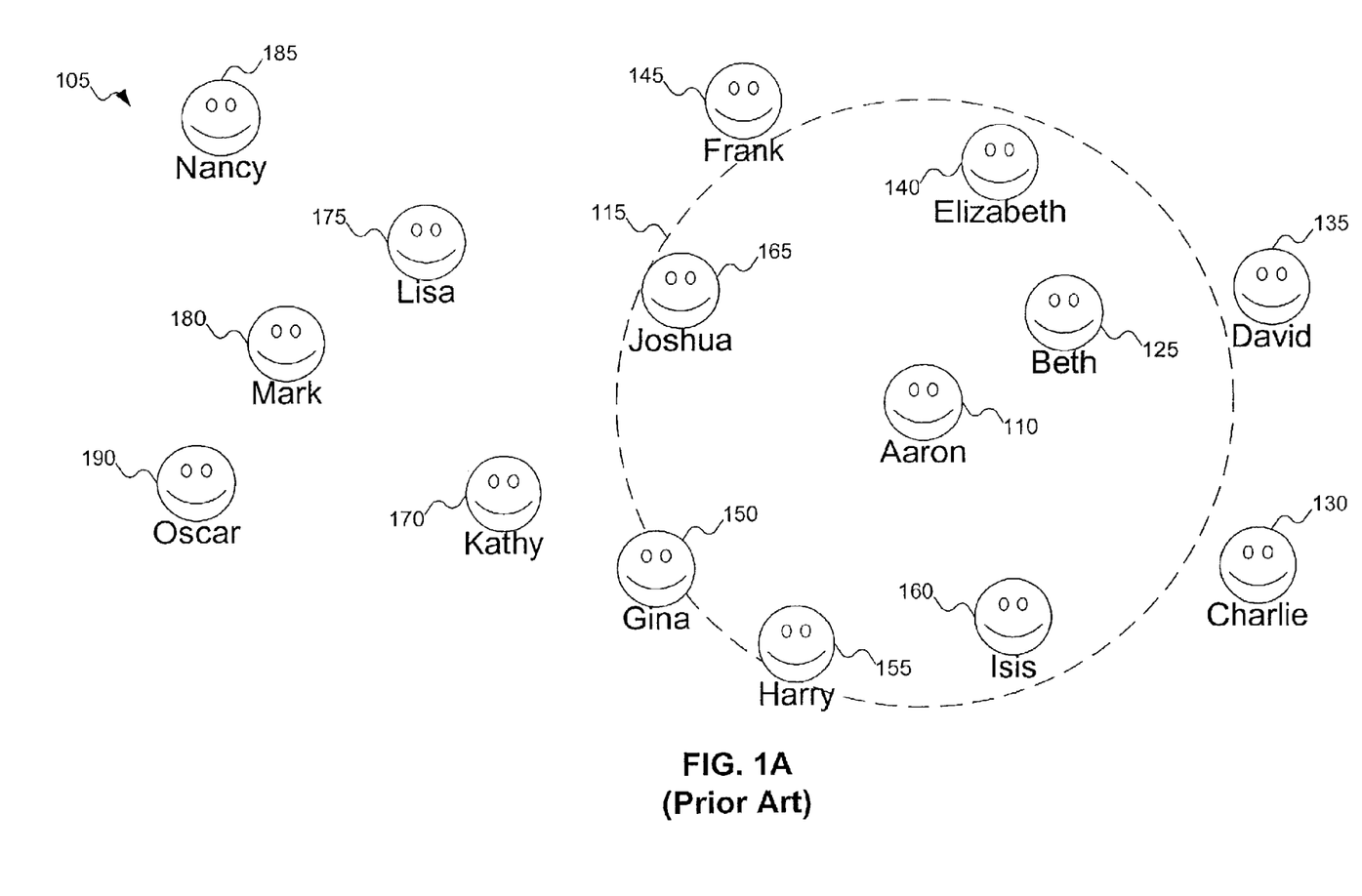
FIG. 1A shows a typical arrangement of mobile ad-hoc network devices.

FIG. 1A shows a scattering of mobile ad-hoc network devices 105. In FIG. 1A, a number of mobile devices are scattered around a location. The location may be a mall, sporting arena, city, or any other type of location, without any limit. In the discussion below, for simplicity of description each person using a mobile device will be described as able to communicate with other persons, although in truth it is the mobile devices that communicate with each other. For example, although the description below may talk about Aaron 110 communicating with Beth 125, it is really Aaron's device that communicates with Beth's device.

Each mobile device has a limited range: for example, Aaron's device 110 has a range 115 shown as a dashed circle. Thus, not every other mobile device has a direct line of communication with every other device. For example, Beth 125 is within direct communications range of Aaron 110, but Charlie 130 is not within direct communications range of Aaron 110.

Figure 1B:
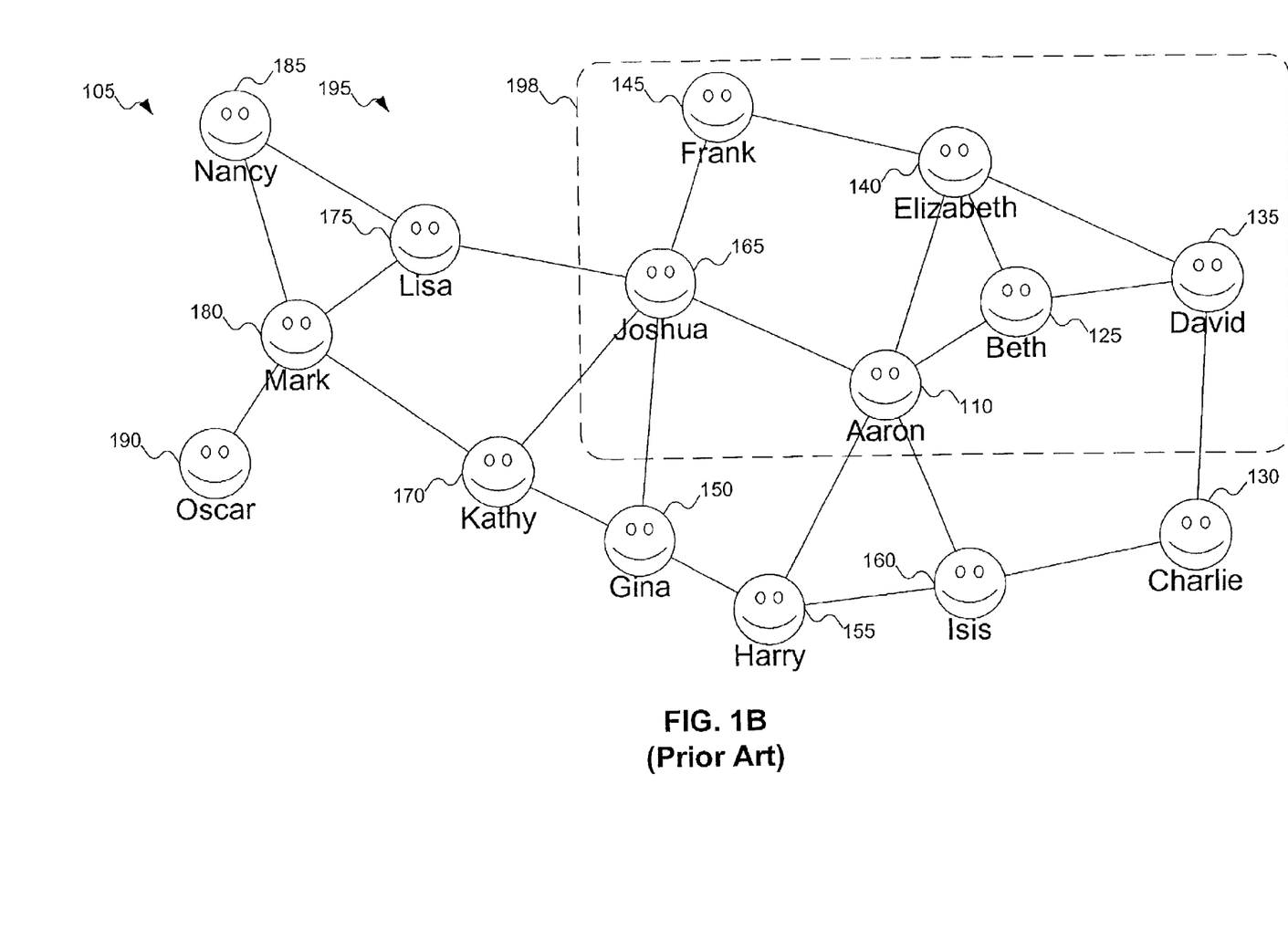
FIG. 1B shows a mobile ad-hoc network established among the mobile ad-hoc network devices of FIG. 1A.

The intuitive approach for managing a MANET is to have each device be aware of all other devices in the MANET. FIG. 1B shows a mobile ad-hoc network 195 established among the mobile ad-hoc network devices of FIG. 1A. As may be seen in FIG. 1B, Aaron 110 may communicate directly with Beth 125, Elizabeth 140, Harry 155, and Isis 160, but may not communicate directly with Charlie 130 or David 135. Nevertheless, Aaron 110 may communicate with Charlie 130 or David 135 through Beth 125 or Isis 160, respectively.

Even if a person is in the MANET, he may not be reachable. For example, consider Oscar 190. Even if Oscar's device is active within the network, given Oscar's location, Oscar 190 may communicate with other devices in the MANET only through Mark 180. If Mark 180 leaves the network (e.g., by turning off his device), Oscar 190 may neither send nor receive messages from anyone else in the MANET.

The intuitive approach to managing a MANET imposes global limitations on the MANET, which may affect conditions at a local level. For example, devices in the MANET may communicate only with one device at a time. Therefore, devices have to schedule their communications with neighboring devices.

The present invention addresses this and other problems associated with the prior art.

DETAILED DESCRIPTION

Referring momentarily to FIG. 1B, the discussion below only refers to sub-network 198 consisting of users Aaron 110, Beth 125, David 135, Elizabeth 140, Frank 145, and Joshua 165. A person skilled in the art will recognize how the embodiment of the invention may be extended to the entire mobile ad-hoc network (MANET) 195 shown.

Figure 2:
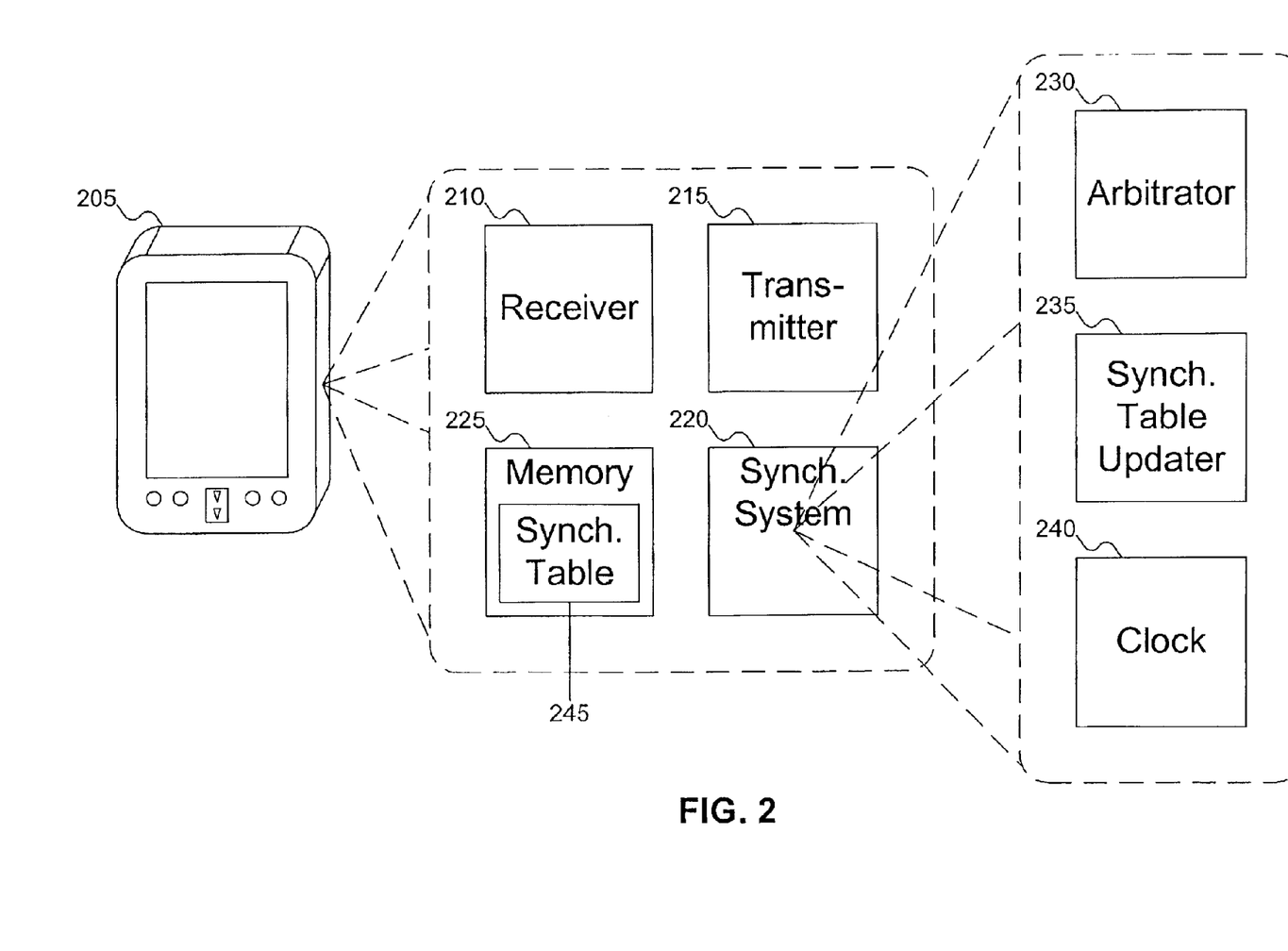
FIG. 2 shows a mobile device operable within the mobile ad-hoc network of FIG. 1B, according to an embodiment of the invention.

FIG. 2 shows a mobile device operable within the mobile ad-hoc network (MANET) of FIG. 1B, according to an embodiment of the invention. In FIG. 2, mobile device 205 is used for communicating with other nearby mobile devices. Although shown as a personal digital assistant (PDA), a person skilled in the art will recognize that mobile device 205 may be any device capable of interacting with nearby devices, typically in a wireless manner. For example, mobile device 205 may be a cellular telephone or notebook computer properly equipped to interact with nearby devices. In fact, mobile device 205 need not be truly mobile: device 205 might be a fixed access point (such as a desktop computer or kiosk within the environment). But for purposes of the discussion below, device 205 will be considered to be mobile.

Mobile device 205 includes, among other components, receiver 210, transmitter 215, synchronization system 220, and memory 225. Receiver 210 is used to receive communications from other nearby mobile devices. Transmitter 215 is used to transmit communications to other nearby mobile devices. Although in a preferred embodiment receiver 210 and transmitter 215 are designed to operate wirelessly, a person skilled in the art will recognize that receiver 210 and transmitter 215 may also be wire-based. Synchronization system 220 is to synchronize device 205 with other nearby devices. And memory 225 is used to store information of a temporary or semi-permanent nature within mobile device 205.

Synchronization system 220 includes three components. First is arbitrator 230. Arbitrator 230 is used to arbitrate the timing and manner of synchronizing with other nearby devices. Second is synchronization table updater 235. Synchronization table updater 235 updates the synchronization table (discussed below) with data as arbitrated by arbitrator 230. Finally, clock 240 is the internal clock of device 205, and is used to monitor the passage of time, as viewed by device 205.

In mobile device 205, memory 225 includes synchronization table 245. Synchronization table 245 stores information about the synchronization between device 205 and other nearby devices. Specifically, synchronization table 245 stores device identifiers, the frequencies with which device 205 communicates with other nearby devices, and the timing interval at which device 205 checks with other nearby devices to see if data is to be transferred.

Among the various operations managed by synchronization system 220 is the entry and exit of devices within the range of device 205. Specifically, as devices enter and leave, the nearby devices with which mobile device 205 may communicate varies. Synchronization system 220 is responsible for determining changes in which devices are nearby and establishing a communications protocol (using arbitrator 230) with new nearby devices.

Figure 3A:
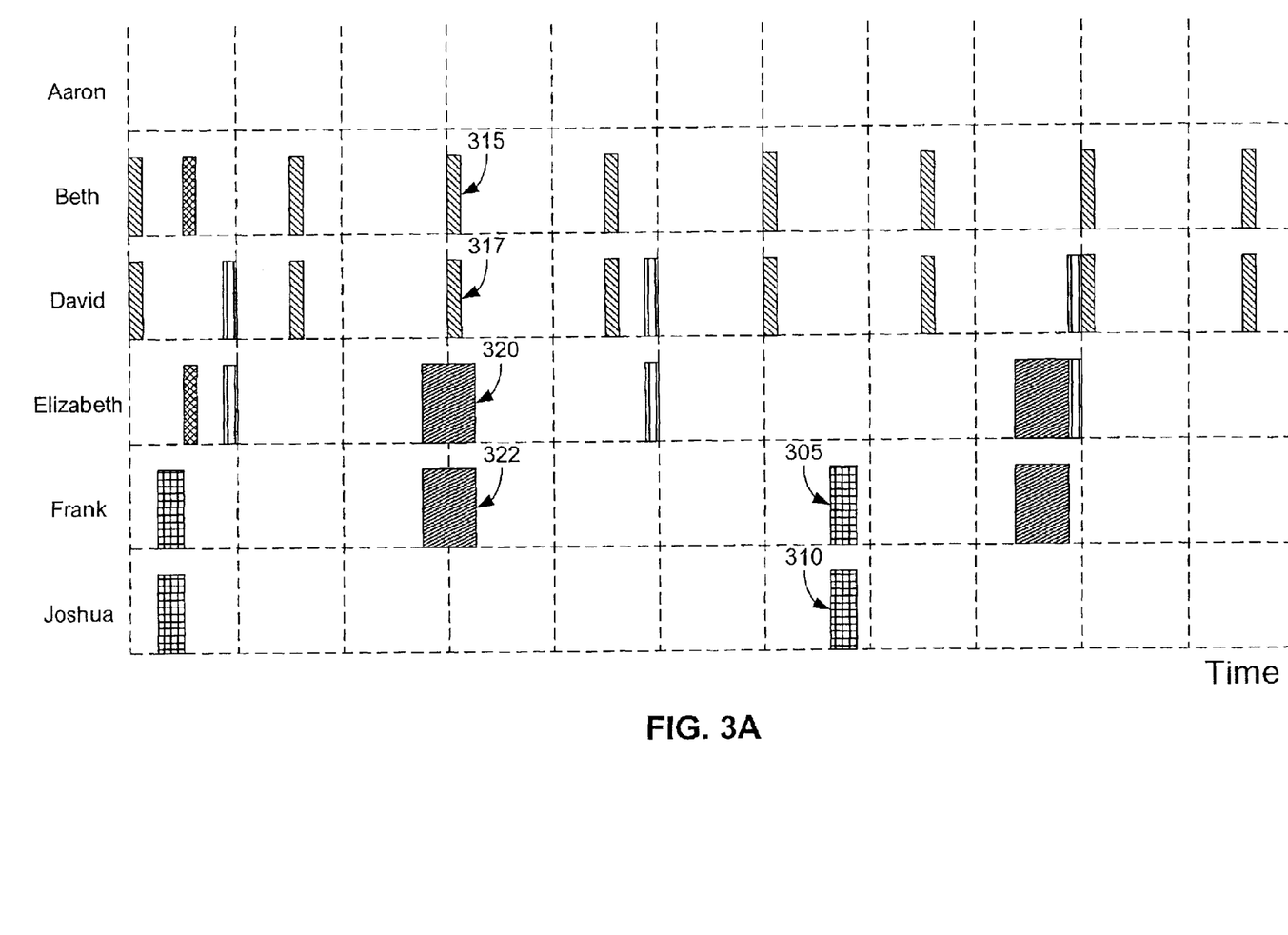
FIG. 3A shows a timing diagram for synchronization of the mobile devices in the mobile ad-hoc network of FIG. 1B before the introduction of Aaron's device, according to an embodiment of the invention.

FIG. 3A shows a timing diagram for synchronization of the mobile devices in the mobile ad-hoc network of FIG. 1B before the introduction of Aaron's device, according to an embodiment of the invention. Time is represented horizontally. Similarly-hatched boxes in rows for two different devices represent communication between the two devices. For example, boxes 305 and 310 show that Frank and Joshua are synchronizing.

Note that different pairs of devices may synchronize at the same time. For example, as shown by boxes 315 and 317 and boxes 320 and 322, Beth and David may synchronize at the same time as Elizabeth and Frank.

Figure 3B:
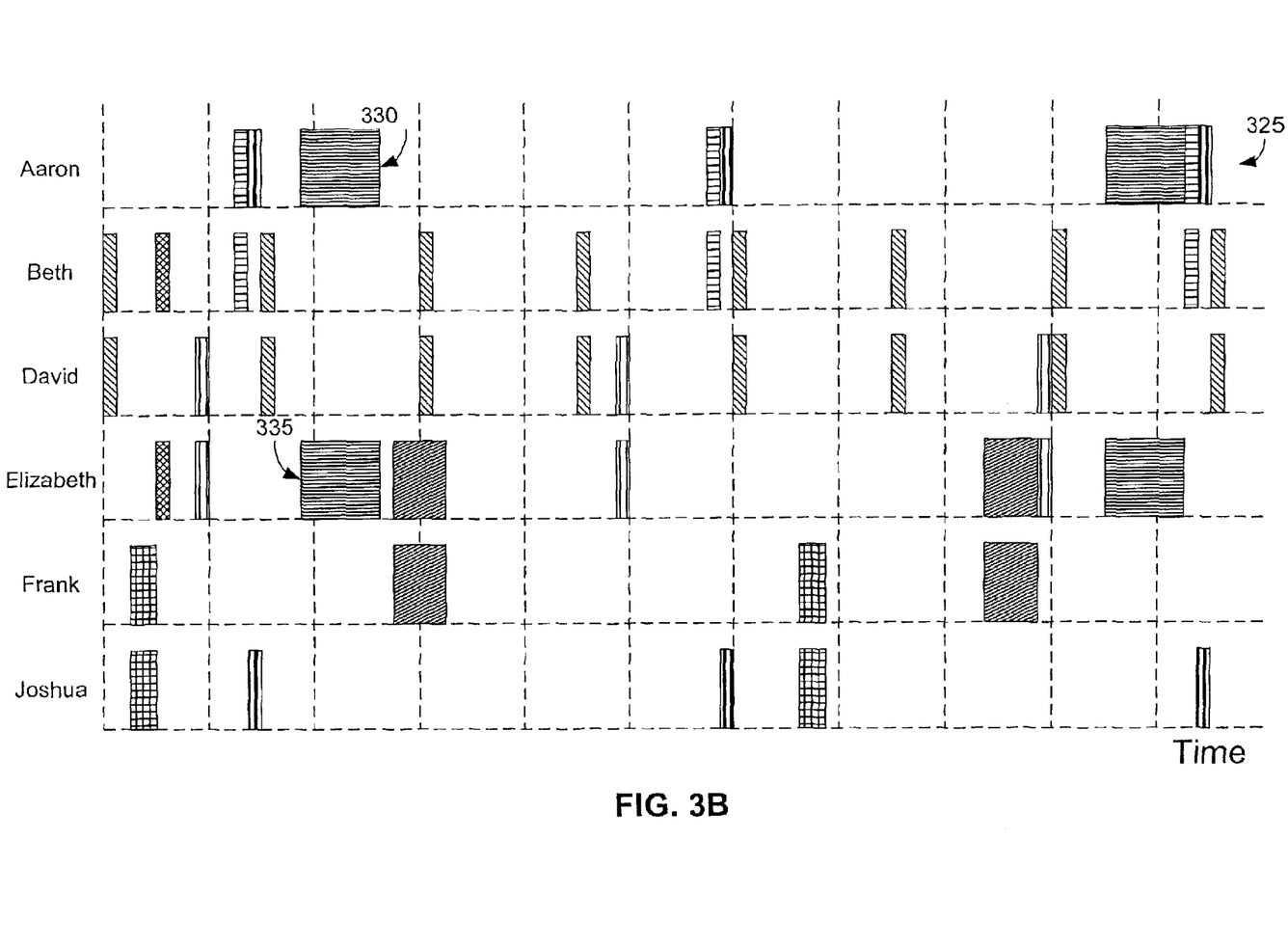
FIG. 3B shows a timing diagram for synchronization of the mobile devices in the mobile ad-hoc network of FIG. 1B after the introduction of Aaron's device, according to an embodiment of the invention.

FIG. 3B shows a timing diagram for synchronization of the mobile devices in the mobile ad-hoc network of FIG. 1B after the introduction of Aaron's device, according to an embodiment of the invention. Aaron has synchronized with the other devices, as shown by row 325. Aaron has agreed to frequencies and synchronization periods/intervals with Beth, Elizabeth, and Joshua, the devices within range of Aaron. For example, as shown by boxes 330 and 35, Aaron and Elizabeth have agreed to mutually-acceptable synchronization periods.

A few comments about synchronization periods are in order. First, the pairs of devices may arbitrate to any mutually-acceptable frequency, communications technology, and synchronization period. The frequency is the particular channel in the electromagnetic spectrum at which the devices communicate. The communications technology specifies how the frequency is to be used for communication. And the synchronization period identifies how frequently the devices synchronize with each other. No limitations are placed on the arbitration at all. In the event a proposed synchronization period collides (in frequency, communications technology, or timing of synchronization) with another for one of the devices, the pair may determine a different synchronization period.

As mentioned briefly above, the communications technology specifies how the devices use the frequency for communication. There are many different communications technologies that the devices may utilize. For example, the devices may agree to a frequency-hopping schedule, so that they change their frequency of communication every so often. Or the devices may use chipping code, spreading the communications across a range of frequencies using a key. Without the key to identify the proper signals, the communication sounds like static. A person skilled in the art will recognize other communications technologies that may be used.

Note that it is possible for nearby pairs of devices to communicate using the same frequency, provided the pairs of devices are capable of differentiating the communications. For example, two adjacent pairs of devices may both use chipping code at the same frequency, if their keys allow them to adequately separate the communications.

Second, the interval between synchronization periods may vary. Depending on the type of communication between the devices, either a low or high latency may be desired. For example, if the mobile devices are transmitting speech, low latency is desired, to avoid long breaks in the spoken output. On the other hand, if one of the mobile devices is a sensor and the other mobile device is a system using the sensor to check a status, only an occasional update is needed, and high latency is acceptable.

Third, the length of the synchronization may vary. Proper synchronization may be more or less critical. By providing a longer synchronization period, a higher degree of certainty of synchronization may be achieved.

Fourth, different communication frequencies may be selected by the pairs of devices. If all devices had to use the same frequency, any signal impinging from one pair of devices might cause destructive interference to nearby pairs of communicating devices. But if pairs of devices can agree to different frequencies and/or communication technologies, the destructive interference from one pair of devices will not impair other nearby devices.

Fifth, note that synchronization periods may be dynamic. Specifically, based on changes in circumstances, a pair of devices may begin a new arbitration and determine a new synchronization period. For example, consider the sensor referred to above. If the value detected by the sensor goes out of range, the sensor may need to report its value more frequently. The sensor may rearbitrate its synchronization period with a neighboring device, to allow for more frequent reports. A person skilled in the art will recognize that other components of the synchronization period, such as frequency, communications technology, or interval, may also be changed as needed.

Sixth, a person skilled in the art will recognize that the duration of the synchronization period is typically as short as possible. Devices engage in synchronization as quickly as possible, so as to spend as much time as possible actually transmitting network traffic, or to conserve power. Nevertheless, a person skilled in the art will recognize that the duration may also be negotiated, and can specifically be longer than the minimum needed.

Other factors may affect the arbitration of frequency, synchronization period, and time interval. For example, traffic patterns, data urgency, quality of service requirements, battery condition, and device life expectancy may affect the arbitration. A person skilled in the art may recognize other factors as well.

Note that during interactions for arbitration and synchronization, no message or application data is transmitted. Only arbitration and synchronization data is transmitted at these times. Synchronization is used to make sure that the devices' clocks are correlated. (Note that the clocks do not have to use the same time periods, only that the devices are aware of how to agree to a common time interval.) Data is transmitted at other times, specifically between scheduled events like synchronization.

But before a device may transmit data, the device has to notify the intended recipient of the data about the communication. This notification is done during the synchronization period. Thus, if a device has data to transmit, the device waits until the synchronization period with the intended recipient device. The device then informs the intended recipient that there is data to transfer. At the first time interval open to both devices, data is transmitted.

Figure 4:
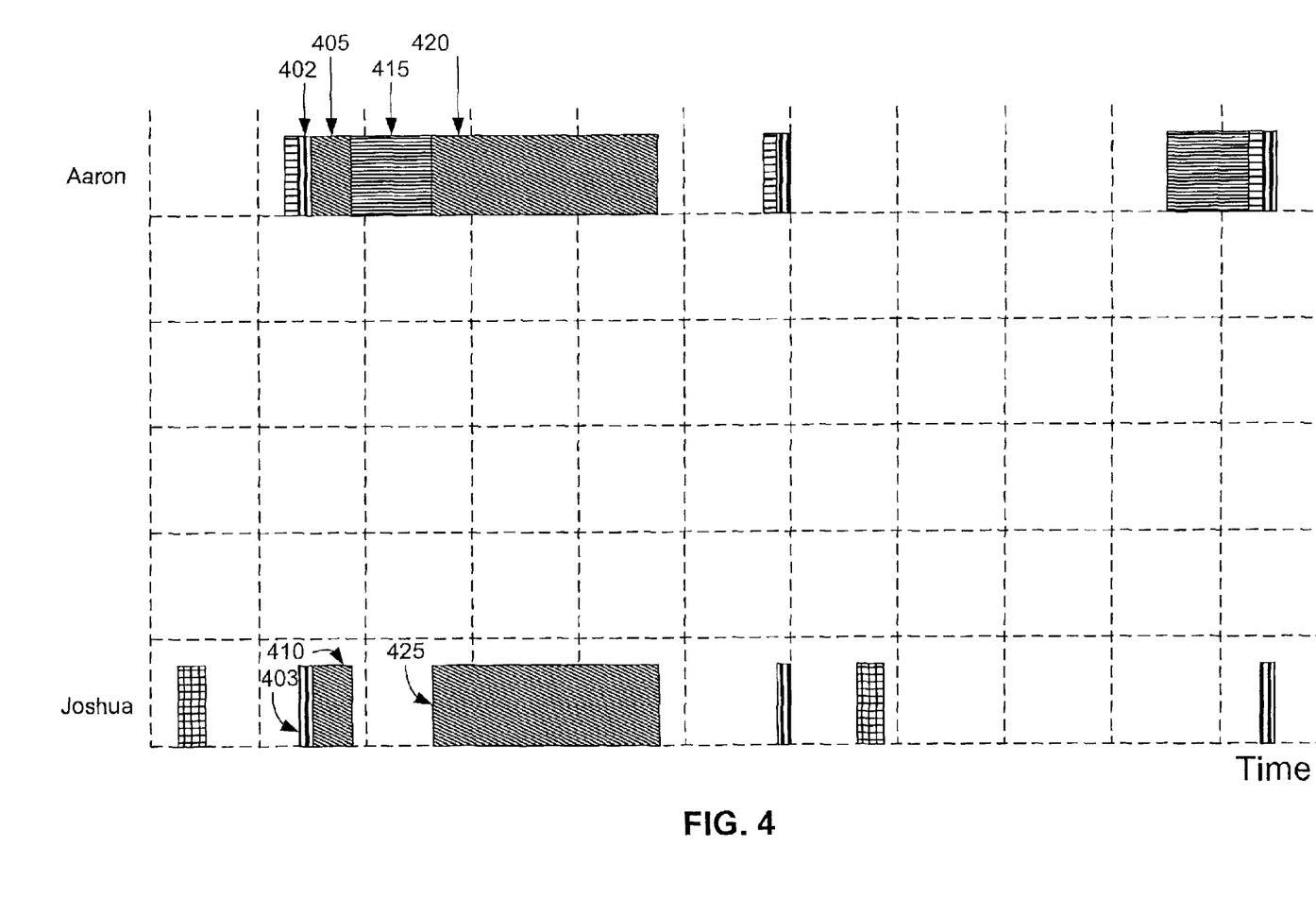
FIG. 4 shows a timing diagram for data transfer between two mobile devices in the mobile ad-hoc network of FIG. 1B, according to an embodiment of the invention.

FIG. 4 shows a timing diagram for data transfer between two mobile devices in the mobile ad-hoc network of FIG. 1B, according to an embodiment of the invention. In FIG. 4, Aaron has data to transmit to Joshua. During the synchronization period (boxes 402 and 403), Aaron notifies Joshua of the data to transmit. Then, at the next time interval when both devices are free, (boxes 405 and 410), Aaron transmits data to Joshua. After notifying Joshua of the data to transfer, both devices wait for their first mutual free interval. In FIG. 4, both devices are free immediately after their mutual synchronization period. So, as shown by boxed 405 and 410, Aaron begins to transfer data to Joshua.

Note that shortly after beginning transmission, Aaron is busy synchronizing with another mobile device (shown by box 415). During this time, Aaron may not transfer data to Joshua (note that Joshua is idle during this time interval). But once Aaron and Joshua are both free again, Aaron resumes transmitting data to Joshua (as shown by boxes 420 and 425).

Figure 5:
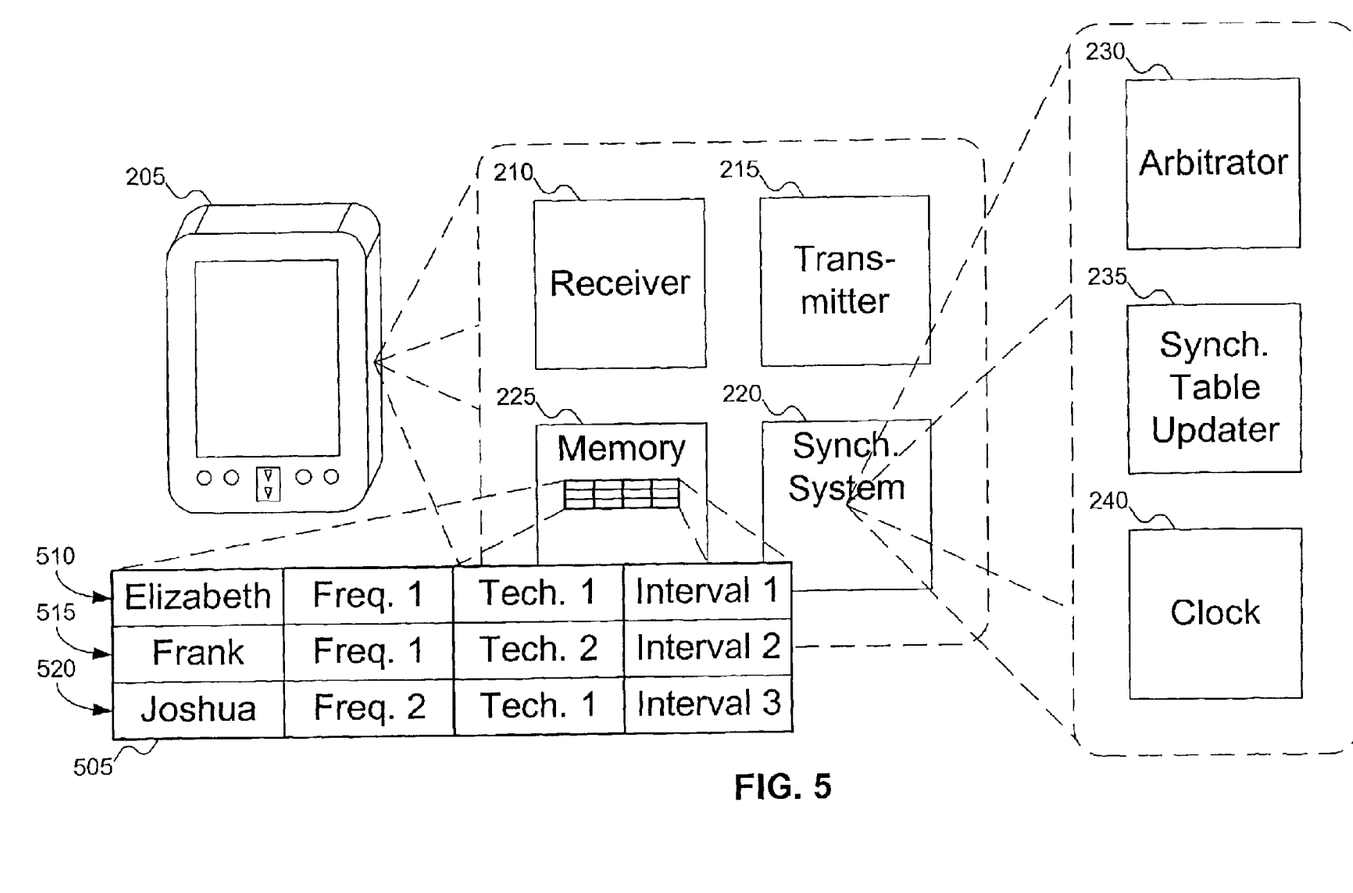
FIG. 5 shows the mobile device of FIG. 2 including a synchronization table, according to an embodiment of the invention.

FIG. 5 shows the mobile device of FIG. 2, according to an embodiment of the invention. In FIG. 5, the details of synchronization table 505 are shown, assuming mobile device 205 belongs to Aaron. Each entry in synchronization table 505 represents communication with another device. Note that synchronization table includes four pieces of data: an identifier for the device with which communication occurs, a frequency upon which communication is to occur, a communications technology to use in communicating with the device, and a time interval at which the communication is to occur. Thus, entry 510 specifies the information used to synchronize with Elizabeth, entry 515 specifies the information used to synchronize with Frank, and entry 520 specifies the information used to synchronize with Joshua.

Time interval may be specified in a number of ways: for example, during each synchronization period, the two devices may agree to the time at which they will next communicate, in which case the agreed time (in terms of the local clock) is stored in synchronization table 505. Or, synchronization may occur at regular intervals, and the time interval may specify the time at which synchronization with that device first occurred (and modulo arithmetic may be used to determine the next time of synchronization).

Note that in all of the above discussion, only a pair of devices is involved. The arbitration and synchronization of each pair of devices creates a peer-to-peer relationship between pairs of devices. The network as a whole is an emergent property of the peer-to-peer relationships between pairs of devices. For example, referring back to FIG. 1B, David 135 may not communicate directly with Frank 145. But if David 135 has a message for Frank 145, David 135 uses the synchronization period established between David 135 and Elizabeth 140 to transmit the message to Elizabeth 140. Elizabeth 140, in turn, uses the synchronization period established between Elizabeth 140 and Frank 145 to transmit the message to Frank 145. In this manner, the network is established, using the peer-to-peer relationships.

Figure 6:
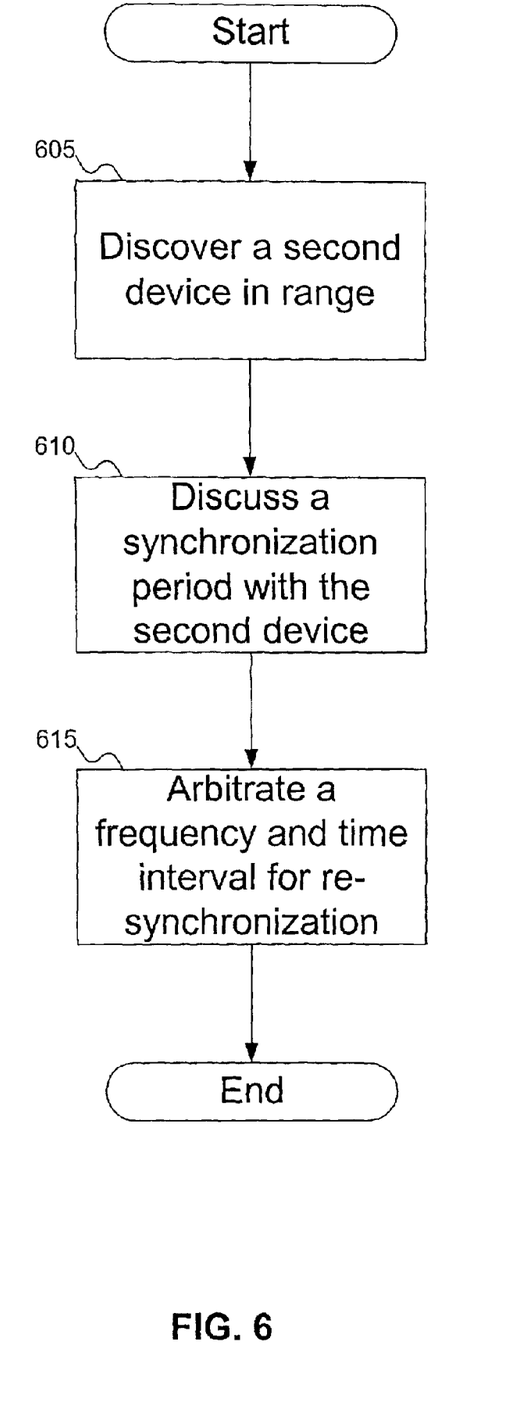
FIG. 6 shows the procedure used by the mobile device of FIG. 2 to synchronize with other mobile devices in the mobile ad-hoc network of FIG. 1B, according to an embodiment of the invention.

FIG. 6 shows the procedure used by the mobile device of FIG. 2 to synchronize with other mobile devices in the mobile ad-hoc network of FIG. 1B, according to an embodiment of the invention. In FIG. 6, at block 605, the device discovers a second device in range. At block 610, the devices communicate to discuss a synchronization period. Finally, at block 615, the devices arbitrate a frequency and time interval to use for synchronization.

Figure 7A:
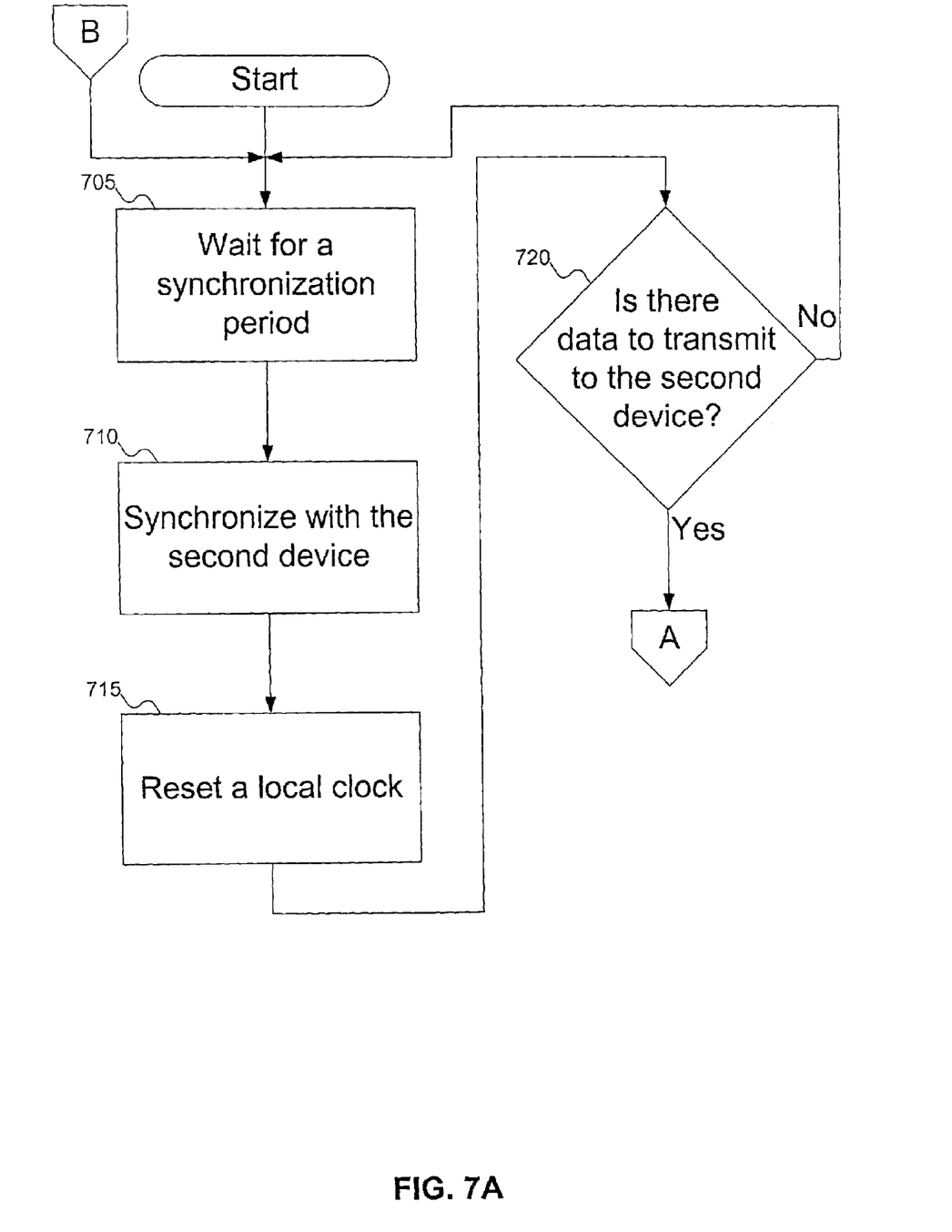
FIGS. 7A and 7B show the procedure used by the mobile device of FIG. 2 to transfer data to another mobile device in the mobile ad-hoc network of FIG. 1B, according to an embodiment of the invention.
Figure 7B:
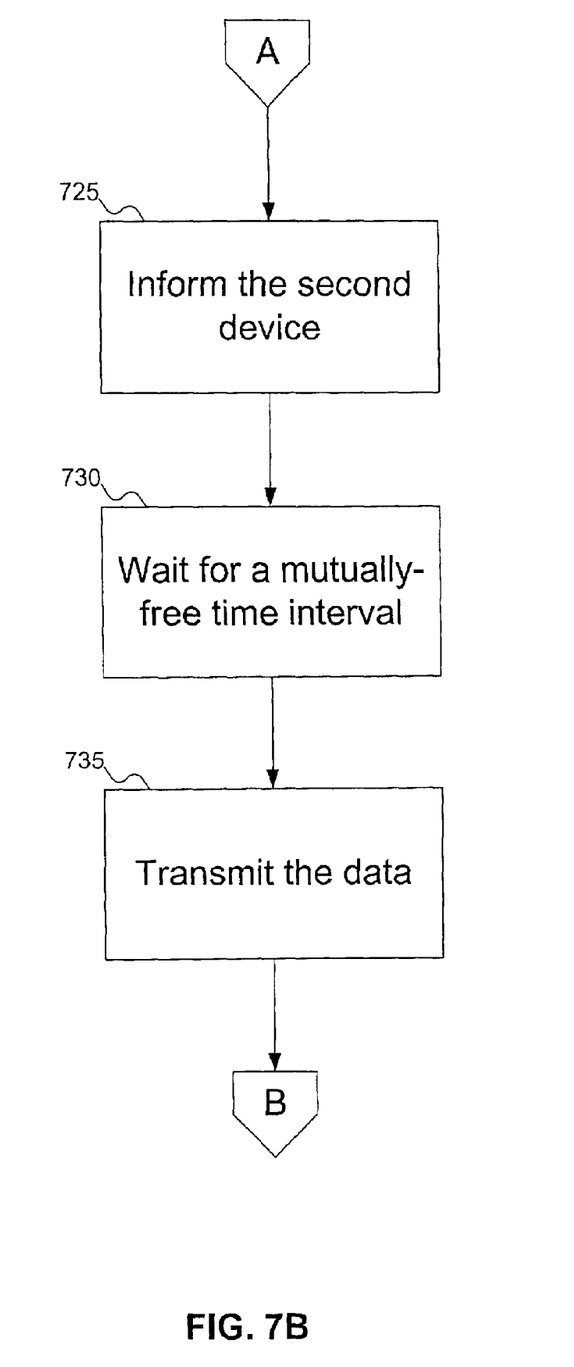

FIGS. 7A and 7B show the procedure used by the mobile device of FIG. 2 to transfer data to another mobile device in the mobile ad-hoc network of FIG. 1B, according to an embodiment of the invention. In FIG. 7A, at block 705, the device waits for the synchronization period with the intended recipient. At block 710, the devices synchronize. At block 715, the devices reset their local clocks. At decision point 720, the devices check to see if there is data to transmit to the other device. If there is no data to transmit, the device returns to block 705 to wait for the next synchronization period. (Typically, the device will be waiting to synchronize with another device, but the device may resume transmitting data to or receiving data from a third device, if the communication was interrupted to synchronize with the other device.)

If there is data to transmit, then at block 725 (FIG. 7B) the device informs the other device of the data. At block 730, the devices wait for a mutually-free time interval. Finally, at block 735 the data is transmitted, and the device returns to block 705 to wait for another synchronization event.

If there is no data to transmit or receive, the device may power down either partially (transceiver) or wholly (complete device) to reduce power consumption. The device would naturally power back up at the agreed-upon synchronization periods.

Having illustrated and described the principles of my invention in an embodiment thereof, it should be readily apparent to those skilled in the art that the invention can be modified in arrangement and detail without departing from such principles. I claim all modifications coming within the spirit and scope of the accompanying claims.

I claim:

1. A mobile communication device comprising:
a synchronization system able to synchronize with first and second mobile communication devices to rout one or more messages from the first mobile communication device to the second mobile communication device by utilizing a first communication technology to a first communication frequency agreed by the first mobile communication device and by utilizing a second communication technology to a second communication frequency agreed by the second mobile communication device.

2. The mobile communication device according to claim 1, further comprising:
a synchronization table listing synchronization information for the mobile communication device.

3. The mobile communication device according to claim 2, wherein the synchronization table includes a device identifier, a communications frequency, a communications technology, and a time interval for resynchronization.

4. The mobile communication device according to claim 1, wherein the synchronization system includes an arbitrator to provide the first and second agreed communications frequencies, the first and second agreed communication technologies, and a time interval for communication.

5. The mobile communication device according to claim 4, wherein the synchronization system further includes a synchronization table updater designed to update a synchronization table to reflect a device identifier the communication frequency, the communication technology and the time interval.

6. A method for a first mobile communication device to communicate with second and third mobile communication devices in an ad-hoc network including at least the first mobile communication device, the second mobile communication device and the third mobile communication device, comprising:
discovering the second mobile communication device;
determining a synchronization period with the second mobile communication device;
synchronizing with the second device by utilizing an agreed communication technology to an agreed communication frequency independently of the third device; and
routing messages from the third mobile communication device to the second mobile communication device.

7. A method according to claim 6, further comprising:
discovering the third device;
determining a synchronization period with the third mobile communication device; and
synchronizing with the third mobile communication device independently of the second mobile communication device.

8. A method according to claim 7, further comprising:
discovering the third mobile communication device by the second mobile communication device;
determining a synchronization period between the second mobile communication device and the third mobile communication device; and
synchronizing the second mobile communication device with the third mobile communication device independently of the first mobile communication device.

9. A method according to claim 6, wherein discovering a second mobile communication device includes discovering the second mobile communication device within range of the first mobile communication device.

10. A method according to claim 6, wherein determining a synchronization period includes arbitrating a time interval between synchronizations.

11. A method according to claim 10, further comprising re-synchronizing with the second mobile communication device after the time interval.

12. A method according to claim 6, wherein determining the synchronization period includes arbitrating a frequency for communicating between the first mobile communication device and the second mobile communication device to provide the agreed communication frequency.

13. A method according to claim 6, wherein determining the synchronization period includes arbitrating a communication technology for communicating between the first mobile communication device and the second mobile communication device to provide the agreed communication technology.

14. A method according to claim 6, wherein synchronizing with the second mobile communication device includes resetting a clock in the first device.

15. A method according to claim 6, wherein synchronizing with the second mobile communication device includes informing the second mobile communication device that the first mobile communication device has data to transmit.

16. A method according to claim 14, further comprising:
arbitrating a time to transmit the data to the second mobile communication device; and
transmitting the data to the second mobile communication device at the arbitrated time.

17. A method according to claim 6, further comprising determining a new synchronization period with the second mobile communication device.

18. A method according to claim 17, wherein determining a new synchronization period includes determining at least one of a new frequency, a new communications technology, and a new time interval.

19. An article comprising:
a storage medium said storage medium having stored thereon instructions that, when executed by a first device in a network including at least the first device, a second device, and a third device, result in:
discovering the second device;
determining a synchronization period with the second device;
synchronizing with the second device by utilizing an agreed communication technology to an agreed communication frequency independently of the third device; and
routing messages from the third communication device to the second device.

20. An article according to claim 19, further comprising:
discovering the third device;
determining a synchronization period with the third device; and
synchronizing with the third device independently of the second device.

21. An article according to claim 19, further comprising:
discovering the third device by the second device;
determining a synchronization period between the second device and the third device; and
synchronizing the second device with the third device independently of the first device.

22. An article according to claim 19, wherein discovering a second device includes discovering a second device within range of the first device.

23. An article according to claim 19, wherein the storage medium has further stored thereon instructions, that, when executed by the first device, result in determining a synchronization period includes arbitrating a time interval between synchronizations.

24. An article according to claim 23, further comprising re-synchronizing with the second device after the time interval.

25. An article according to claim 19, wherein determining the synchronization period includes arbitrating a frequency for communicating between the first device and the second device to provide the agreed communication frequency.

26. An article according to claim 19, wherein determining the synchronization period includes arbitrating a communication technology for communicating between the first device and the second device to provide the agreed communication technology.

27. An article according to claim 19, wherein synchronizing with the second device includes resetting a clock in the first device.

28. An article according to claim 19, wherein synchronizing with the second device includes informing the second device that the first device has data to transmit.

29. An article according to claim 28, wherein the storage medium has further stored thereon instructions, that, when executed by the first device, result in:

arbitrating a time to transmit the data to the second device; and transmitting the data to the second device at the arbitrated time.

30. An article according to claim 19, wherein the storage medium has further stored thereon instructions, that, when executed by the first device, result in determining a new synchronization period with the second device.

31. An article according to claim 30, wherein determining a new synchronization period includes determining at least one of a new frequency, a new communications technology, and a new time interval.

* * * * *